United States Patent [19]
Mildren

[11] Patent Number: 5,481,220

[45] Date of Patent: Jan. 2, 1996

[54] DUAL MATCHING CURRENT SINK TOTAL TEMPERATURE CIRCUIT

[75] Inventor: James W. Mildren, Rio Rancho, N.M.

[73] Assignee: Honeywell Inc., Minneapolis, Minn.

[21] Appl. No.: 422,682

[22] Filed: Apr. 13, 1995

Related U.S. Application Data

[63] Continuation of Ser. No. 81,455, Jun. 22, 1993, abandoned.

[51] Int. Cl.⁶ .............................. H01L 35/00; G01K 7/00
[52] U.S. Cl. ........................ 327/512; 327/513; 374/183
[58] Field of Search ..................................... 307/350, 358, 307/310; 374/183; 327/50, 52, 54, 72, 512, 513

[56] References Cited

U.S. PATENT DOCUMENTS

| | | | |
|---|---|---|---|
| 3,873,857 | 3/1975 | Farrish | 307/310 |
| 3,973,147 | 8/1976 | Yu | 307/310 |
| 4,004,462 | 1/1977 | Dobkin | 307/310 |
| 4,246,786 | 1/1981 | Wiemer et al. | 29/612 |
| 4,546,373 | 10/1985 | Todd | 307/310 |
| 4,924,114 | 5/1990 | Ruhle | 307/310 |
| 4,953,986 | 9/1990 | Olson et al. | 374/136 |
| 5,030,849 | 7/1991 | Brokaw | 307/310 |
| 5,095,453 | 3/1992 | Pierson et al. | 364/571.01 |
| 5,116,136 | 5/1992 | Newman | 307/310 |

OTHER PUBLICATIONS

Microelectronic Circuits, A. S. Sedra & Kenneth C. Smith pp. 97, 105–106 HRW Inc., New York, N.Y. 1987.

*Primary Examiner*—William L. Sikes
*Assistant Examiner*—Tiep H. Nguyen
*Attorney, Agent, or Firm*—Kenneth J. Johnson; Ronald E. Champion

[57] ABSTRACT

The disclosure relates to a calibration-free analog processing circuit for use with an outside total temperature probe and an air data computer. Dual matching transistors are used to sink the current. A reference buffer provides operating current to the matching transistors. The output of the dual transistors represents the resistance in the probe and thereby the outside temperature.

18 Claims, 1 Drawing Sheet

DUAL MATCHING CURRENT SINK TOTAL TEMPERATURE CIRCUIT

GOVERNMENT RIGHTS

The United States Government has rights in this invention pursuant to Contract No. F04606-90-D-0002, awarded by the Department of the Air Force. This application is a continuation of application Ser. No. 08/081,455, filed on Jun. 22, 1993, now abandoned.

BACKGROUND OF THE INVENTION

1. Field of the Invention

The invention relates to circuitry for use with an air data computer, more particularly, for calibration free analog circuitry used to monitor a temperature probe.

2. Discussion of the Prior Art

Modern aircraft use temperature responsive resistance probes to monitor the temperature of the air through which the aircraft fly. The probe connects through a wiring harness and processing circuitry to the plane's air data computer (ADC). Typical prior art circuitry used for temperature monitoring using a resistive probe, in combination with air data computers for aviation applications, such as in the F/A-18, utilize discrete analog circuitry. Such prior art devices must be calibrated at final test, and at any time during the service of the ADC that excessive error is detected. Such calibration requires bench calibration using a precision voltmeter. Calibration takes one to two hours during manufacture. Moreover, the prior art devices require a larger number of parts, more expensive parts and more circuit board space than does a circuit in accordance with the invention. Too, the manufacturing costs of prior art devices are higher than those of the invention which uses several relatively low cost ratio-metric resistors, i.e., resistors within integrated circuits, and only a few costlier absolute resistors. Significantly, the circuitry of the invention provides essentially 25% greater accuracy than the prior art discrete analog devices. The circuit of the invention requires no calibration with use since essential components are generally paired, age together and any errors from aging substantially offset one another.

SUMMARY OF THE INVENTION

In accordance with the invention there is provided an analog monitoring circuit for use with a temperature sensitive resistance probe and an air data computer. The circuit comprises a reference buffer structure for creating adequate operating current in response to input from a reference voltage source operable at a selected voltage, matching dual current structure operatively connected to the reference buffer structure and the probe for producing an output representative of the resistance of the probe and thereby the temperature of the probe, and differential amplifier structure operatively connected to the matching dual current structure for developing the gain desired. The invention further comprises voltage invertor structure operatively connected to the differential amplifier structure.

The matching dual current structure can comprise a matching pair of transistors and an operational amplifier operatively connected to the bases of each of the transistors and in a feedback loop with one of the transistors. The emitters of the transistors are preferably operatively connected to the reference buffer structure through matched precision resistors. The collector of one of the transistors connects to the probe and the collector of the other transistor preferably connects through a precision resistor tailored to the particular probe used.

OBJECTS AND ADVANTAGES OF THE PRESENT INVENTION

One object of the present invention is to provide temperature monitoring without a need for calibration.

Another object of the invention is to save costs in the construction of a temperature monitoring circuit.

One advantage of the instant invention is that integrated analog circuits in accordance therewith provide significantly greater accuracy than do prior art discrete analog devices.

Another advantage of the invention is that a circuit in accordance therewith utilizes fewer parts than do prior art devices.

Other objects, features and advantages of the invention will become apparent to those skilled in the art from the description of the preferred embodiment, claims and drawings hereof, wherein like numerals refer to like elements.

DESCRIPTION OF THE PREFERRED EMBODIMENT

Figure 2:
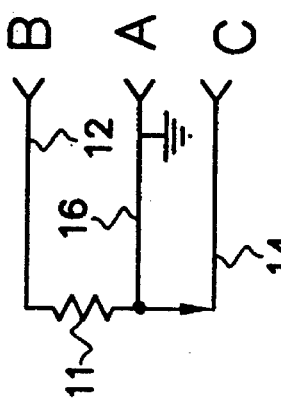
FIG. 2 is a schematic showing a platinum temperature probe for use with the preferred embodiment of the invention.

Modern aircraft measure outside air temperature using a resistive platinum probe. Total temperature (TT) is the temperature of a sample of air through which an aircraft is moving, which has been compressed by bringing it up to the speed of the aircraft. The air heats a platinum wire probe, such as probe 11 as seen in FIG. 2, which is connected to a processing circuit such as the preferred embodiment of FIG. 1, through harness lines 12 through connector B and 14 through connector C and grounded through harness line 16, connector A. The resistance of the platinum wire probe changes with temperature in accordance with the Callendar-Van Dusen Equation:

$$\frac{Rt}{Ro} = 1 + \alpha\left[ T - \gamma\left(\frac{T}{100} - 1\right)\left(\frac{T}{100}\right) - \beta\left(\frac{T}{100} - 1\right)\left(\frac{T}{100}\right)^3 \right]$$

where RT is the probe resistance at temperature T, Ro is the probe resistance at 0° C., and $\alpha$, $\beta$ and $\gamma$ are constants associated with the probe construction. The temperature range for a particular probe usable with the preferred embodiment is −100° to +450° C. Over this temperature, the probe resistance changes from 35Ω at −100° C. to 50Ω at 0° C. and 95Ω at +450° C.

The preferred embodiment of the invention is a highly reproducible analog device and involves only 7 components. No potentiometer or other calibration devices are necessary. Those skilled in the art will recognize that the circuit of the invention is usable with all air data computers, although the −10 voltage of the preferred embodiment is particularly applicable for use in the F/A-18.

Figure 1:
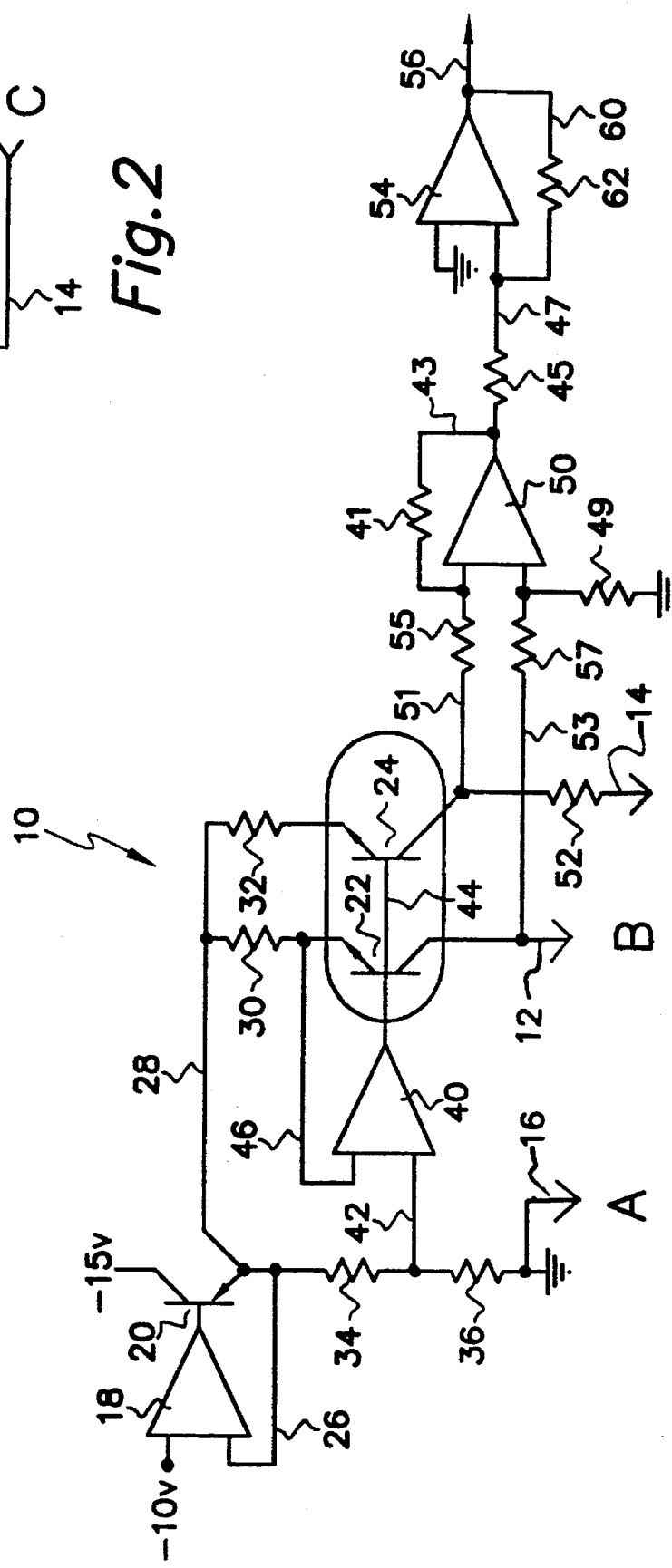
FIG. 1 schematically illustrates the analog circuit of a preferred embodiment of the invention.

FIG. 1 schematically shows the preferred embodiment of the invention 10, an analog circuit for indicating ambient temperature outside an aircraft from a remote sensor located outside the skin of the aircraft. The aircraft wiring harness, comprising the excitation wire 12 (connector B), return wire 14 (connector C) and ground wire 16 (connector A), can be in excess of 20 feet which presents resistance which could introduce error into the total temperature measurement if it was not offset by current flowing in the return leg 14 of the harness. Resistor 52, tailored to match the base resistance of the particular probe used, causes the voltage of the output 56 to be at midpoint (+5 volts) when the probe resistance is at midpoint (65Ω) of its specified resistance within the temperature range. The return leg 14 therefore has substantially equal voltage drop to that of the excitation leg 12. Any voltage offset caused by the resistance of the excitation leg 12 is nulled by creating a matching current in the return leg 14 using the dual matching current sink circuit of the invention.

The preferred embodiment 10 comprises a first operational amplifier 18 which outputs to the base of a bipolar PNP transistor 20, the reference voltage applied to operational amplifier 18 being −10 volts. The collector of transistor 20 connects to a −15 volt source which provides the additional current needed to the circuit.

Feedback to the input of the operational amplifier 18 is provided from the emitter of transistor 20 by line 26. The operational amplifier 18 and transistor 20, as connected to voltage sources and to one another, perform as a reference buffer. A line 28 connects the output of the buffer through high precision resistors 30 and 32 which are each 100Ω, ±0.01% to the emitters of matched NPN transistors 22 and 24.

5kΩ and 45kΩ resistors 34 and 36 provide a −9 volt reference voltage input to a second operational amplifier 40 through input line 42. Second operational amplifier 40 acts as a voltage follower which controls the pair of matching bipolar transistors 22 and 24 through line 44 connected to their bases. A feedback loop 46 from the emitter of transistor 22 forces that point to −9 volts. Thus, the transistor emitter connected sides of each of the 100Ω precision resistors 30 and 32 are maintained at −9 volts, while the other sides of resistors 30 and 32 connected to line 28 are at −10 volts. The current through each precision resistor 30 and 32 is, hence, one volt divided by 100Ω, i.e., 10 milliamps. These currents are "sunk" from the total temperature excitation and return connections 12 and 14.

A third operational amplifier 50 inputted by lines 51 and 53 through 13.3kΩ resistors 55 and 57 from the collectors of transistors 22 and 24, respectively, amplifies the voltage drop across the probe 11 minus the voltage drop across the 31.6Ω precision resistor 52, to develop an appropriate gain for input to the air computer (not shown). The output of operational amplifier 50 is provided with a feedback loop 43 through a 200kΩ resistor 41 to input line 51. Input line 53 between resistor 57 and amplifier 50 connects to ground through a 200kΩ resistor 49. A fourth operational amplifier 54, connected to the output of operational amplifier 50 by line 47 through 20kΩ resistor 45, inverts the voltage output from operational amplifier 50 to make it compatible with hardware and software on the airplane. A feedback loop 60 through a 20kΩ resistor 62 connects output line 56 to input line 47. The output 56 of the circuit 10 to the air data computer is 0.509 volts at a 35Ω probe resistance to 9.445 volts at 95Ω probe resistance.

Resistors 34, 36, 41, 45, 49, 55, 57 and 62 are all ratio-metric, i.e., fabricated inexpensively within integrated circuitry. These resistors age together to minimize error and eliminate any need to recalibrate the circuit with use. Only resistors 30, 32 and 52 are absolute. Naturally, probe 11 is absolute.

Those skilled in the art will appreciate that the same circuit structure can be utilized with +10 voltage reference and a +15 voltage supply by changing transistor 20 to an NPN transistor and using matching PNP transistors in place of NPN transistors 22 and 24.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

The embodiments of the invention in which an exclusive property or right is claimed are defined as follows:

1. An analog monitoring circuit for use with a temperature sensitive resistance probe and an air data computer, said circuit comprising:

reference buffer means for creating adequate operating current in response to input from a reference voltage source operable at a selected voltage;

matching dual current means operatively connected to said reference buffer means through ratio-metric voltage divider means, said matching dual current means is also connected to the probe and provides an output representative of the resistance of the probe and thereby the temperature of the probe; and differential amplifier means operatively connected to the matching dual current means for developing a desired gain.

2. The invention of claim 1 further comprising voltage invertor means operatively connected to said differential amplifier means.

3. The invention of claim 2 wherein said voltage invertor means connects to said differential amplifier means through ratio-metric resistance means.

4. The invention of claim 3 wherein said voltage invertor means comprises ratio-metric resistance feedback means.

5. The invention of claim 1 wherein said matching dual current means comprises a matching pair of transistors, each transistor having a base, an emitter and a collector, and an operational amplifier operatively connected to the base of each of the transistors and in a feedback loop with one of the transistors.

6. The invention of claim 5 wherein the emitters of said transistors are operatively connected to said reference buffer means through matched precision resistors.

7. The invention of claim 5 wherein the collectors of said transistors connect to the probe through a precision resistor tailored to the particular probe used.

8. The invention of claim 1 wherein said differential amplifier means connects to output of said matching dual current means through ratio-metric resistance elements.

9. The invention of claim 8 wherein said differential amplifier means comprises ratio-metric resistor feedback means.

10. An analog monitoring circuit for use with a temperature sensitive resistance probe and an air data computer, said circuit comprising:

reference buffer means for creating adequate operating current in response to input from a reference voltage source operable at a selected voltage;

matching dual current means comprised of a matching pair of transistors and an operational amplifier operatively connected to a base of each of the transistors and in a feedback loop with one of the transistors, said matching dual current means is operatively connected to said reference buffer means and the probe for producing an output representative of the resistance of the probe and thereby the temperature of the probe; and differential amplifier means operatively connected to the matching dual current means for developing a desired gain.

11. The invention of claim 10 further comprising voltage invertor means operatively connected to said differential amplifier means.

12. The invention of claim 11 wherein said voltage invertor means connects to said differential amplifier means through ratio-metric resistance means.

13. The invention of claim 12 wherein said voltage invertor means comprises ratio-metric resistance feedback means.

14. The invention of claim 10 wherein emitters of said transistors are operatively connected to said reference buffer means through matched precision resistors.

15. The invention of claim 10 wherein collectors of said transistors connect to the probe through a precision resistor tailored to the particular probe used.

16. The invention of claim 10 wherein said differential amplifier means connects to an output of said matching dual current means through ratio-metric resistance elements.

17. The invention of claim 10 wherein said differential amplifier means comprises ratio-metric resistor feedback mean coupled to said matching dual current means.

18. The invention of claim 10 wherein said reference buffer means connects to said matching dual current means through ratio-metric voltage divider means.

* * * * *